J. HOPKINSON & C. H. MALTBY.
FEEDING MECHANISM FOR MEAT SLICING MACHINES.
APPLICATION FILED JUNE 22, 1916.
1,284,684.
Patented Nov. 12, 1918.
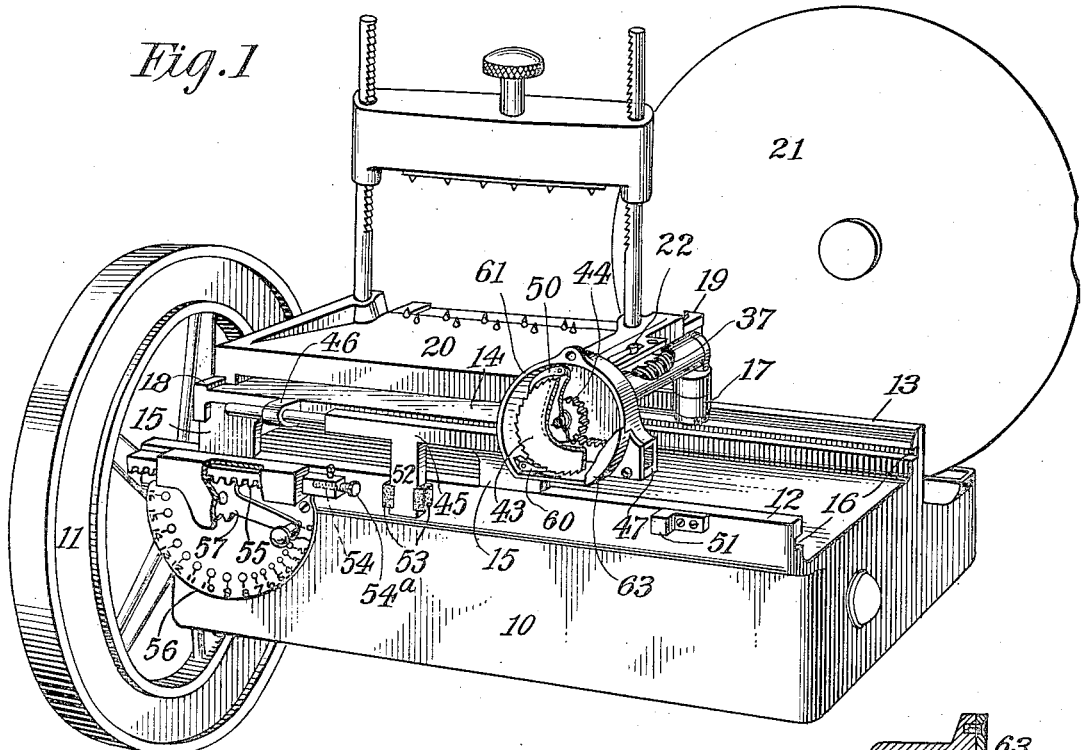
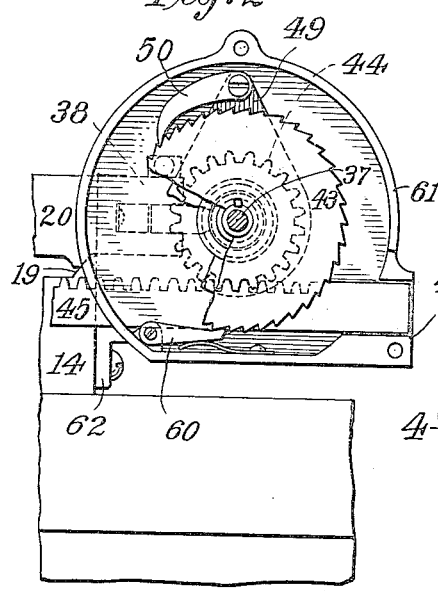
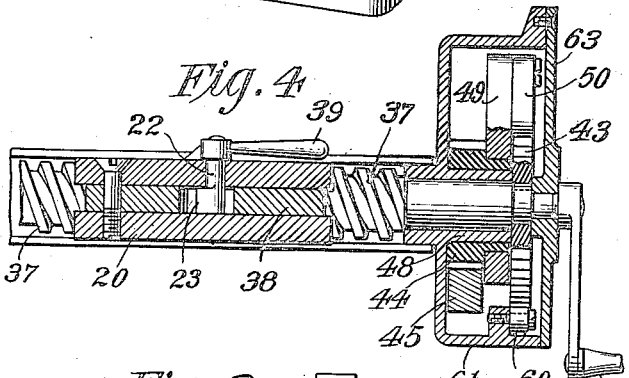
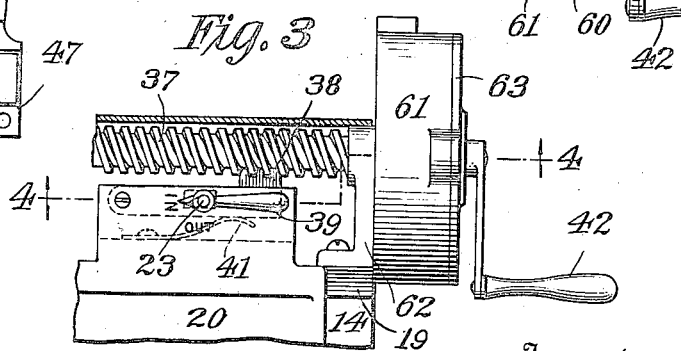
Inventor
Joseph Hopkinson
and Clinton Holt Maltby
By their Attorneys
Kerr Page Cooper + Hayward

UNITED STATES PATENT OFFICE.

JOSEPH HOPKINSON AND CLINTON HOLT MALTBY, OF DAYTON, OHIO, ASSIGNOR TO THE COMPUTING SCALE COMPANY, OF DAYTON, OHIO, A CORPORATION OF OHIO.

FEEDING MECHANISM FOR MEAT-SLICING MACHINES.

1,284,684. Specification of Letters Patent. Patented Nov. 12, 1918.

Application filed June 22, 1916. Serial No. 105,107.

*To all whom it may concern:*

Be it known that we, JOSEPH HOPKINSON and CLINTON HOLT MALTBY, both citizens of the United States, both residing at Dayton, in the county of Montgomery and State of Ohio, have invented certain new and useful Improvements in Feeding Mechanism for Meat-Slicing Machines; of which the following is a full, clear, and exact description.

This invention relates to certain new and useful improvements in table feeding devices for meat slicing machines of the form shown in our copending application Ser. No. 43,913, filed August 6th, 1915, now Patent No. 1,210,476, issued January 2, 1917.

The objects of this invention reside in improved table feeding mechanism. The improved feed mechanism is such that by adjustments of a graduating index, the operating mechanism can be readily adjusted to vary the thickness of the slice of meat cut by the machine. This mechanism is of such construction that the adjustment may be readily made when the machine is in operation. The index also shows on a graduated scale the thickness of the slice of meat being cut. The feeding mechanism is simplified and less likely to get out of order than the prior feeding mechanism used in meat slicers. Other objects of my invention will be pointed out in detail in the accompanying specification, shown in the drawings, and more particularly pointed out in the appended claims.

In the drawings:—

Figure 1 shows a perspective view of a meat slicing machine including our improved feeding devices. Certain parts are shown broken away to show the construction.

Fig. 2 is a detail end view of the ratchet device for operating the feed screw for the meat plate.

Fig. 3 is a top plan view of the feed screw showing the coöperation with the meat plate.

Fig. 4 is a sectional view taken on line 4—4 of Fig. 3 and looking in the direction of the arrows.

In more detail, in Fig. 1, 10 is the base of the machine and 11 a fly wheel which is mounted on the end of the driving shaft which is journaled within the base. The upper face of the base is provided with guide rails 12 and 13 upon which is slidably mounted a meat plate table 14. The feet 15 of this meat plate table rest upon the guide rails and are provided with projecting lugs not shown which extend down and engage slots 16 in the said rails. In this way the meat plate table is held in position on the rails but at the same time is free to slide longitudinally thereon. The meat plate table is given a back and forth reciprocating motion along the guide rails by means of the connecting rod 17 which is connected to one end of the table and at its opposite end is connected with a crank pin driven by the driving shaft of the machine. The reciprocating drive of the meat table is a construction well known in the art and is shown in the patents to Van Berkel Reissue No. 13,180, Brinnhauser No. 853,254 and Burkhardt No. 857,155.

The meat plate table 14 has transverse guiding rails 18 and 19 which slidably support a meat plate 20. These supports permit the meat plate 20 to move freely in a transverse direction with respect to the direction of reciprocation of the meat plate table 14. The meat plate 20 carries any of the well known and usual meat clamping means which are used in the art. A circular knife 21 is driven in the usual manner and is adapted to cut a slice from the meat on the meat plate at each reciprocation of the meat plate table.

*Meat plate transverse feeding mechanism.*

As previously explained, the meat plate is adapted to be moved transversely with respect to the direction of reciprocation of the meat plate table. This transverse movement of the plate is utilized to advance the meat for each slicing operation. In order that uniform thicknesses of meat may be sliced, we provide a feeding mechanism to advance the meat plate by uniform increments. It is also necessary to vary the increment of feed since it is desirable to have machines which can cut slices of varying thickness. It is also desirable that the mechanism for controlling the thickness of slices be so constructed that the adjustment can be changed while the machine is in operation. To these ends we provide a feed mechanism which is carried on the meat plate table. The said table also carries a member which is adapted to be moved relatively to the table and thus operate the feeding mechanism. This member is arrested by stops, and by varying the point at which the member is arrested the increment of feed may be varied at will.

The meat plate 20 is adapted to be moved transversely by means of a feed screw 37 which engages a threaded block 38 pivotally carried by the plate 20. The threaded block is normally held in engagement with the feed screw 37 by a spring 41 but when it is desired to slide the plate by hand the shift handle 39 shown in Figs. 3 and 4 is turned from in to out position. The handle is mounted upon a pivoted stud 22 which stud carries a cam member 23, see Fig. 4, which engages with a slot in the screw block 38 and in this way moves the block 38 into or out of engagement with the feed screw 37. For advancing the meat plate 20 toward the cutting knife by hand we provide a handle 42 on the end of the feed screw. By turning this handle the feed screw can be rotated and the meat plate rapidly advanced toward the circular knife, see Figs. 3 and 4.

Slidably mounted in guides 46 and 47 on the meat plate table is a rack member 45. The rack teeth on this rack bar are adapted to mesh with a pinion 44 which pinion is revolubly mounted on the sleeve 48 which forms a bearing for one end of the feed screw. Rigidly secured to the pinion 44 is a rock arm 49 which carries a pawl 50 which engages the teeth of a ratchet wheel 43. The ratchet wheel 43 is pinned or otherwise secured to the end of the feed screw 37. To prevent a retrograde movement of the ratchet 43 and feed screw 37, we provide a pivoted spring pressed retaining pawl 60, see Fig. 2. The above mentioned parts, namely, 44, 49, 50, 43 and 64, are preferably inclosed in a housing 61 which may be integral with sleeve 48 and which is supported by a bracket 62 on meat plate table 14, as shown in Fig. 3. A cover plate 63 forms a closure for the open side of this housing and also forms a bearing for the end of feed screw 37.

It will be seen that on moving rack 45 back and forth the ratchet wheel 43 will be given a step by step motion which will in turn move the meat plate transversely. The rack 45 is free to move through the guides 46 and 47 in a direction parallel with the line of motion of the meat table. Normally the rack moves in unison with the meat table and imparts no motion to the ratchet wheel. To impart a relative motion to the rack with respect to the meat table we provide a lug 51 on the base of the machine. This lug is adapted to contact with a downwardly extending lug 52 on the rack and arrest the rack as the meat table advances. The lug 52 is preferably provided with felt cushion blocks 53 to reduce the shock of contact of lug 51 and 53 and minimize the noise. Upon lug 52 contacting against lug 51 rack 45 is moved relatively rearward with respect to the meat table thereby turning the pinion 44 and moving pawl 50 idly over the teeth of ratchet 43. This restores the parts preliminary to the feeding movement. For arresting the feed rack on the opposite movement of the meat table and thus actuating the ratchet wheel 43 and feed the meat plate 20 transversely we provide an adjustable plunger 54. This plunger preferably carries an adjusting set screw 54$^a$ as shown in Fig. 1. A suitable locking set screw is also provided to maintain the adjustment of screw 54$^a$ after it has once been set. Set screw 54$^a$ and plunger 54 are in alinement with the lug 52 on the feeding rack and are so positioned that upon the rearward movement of the feed rack the screw 54$^a$ is encountered by the depending lug 52, thereby arresting the rack and moving it relatively to the meat plate table. Such movement of the rack 45 turns pinion 44 and through pawl 50 turns the ratchet wheel 43 thereby turning the feed screw 37, which latter is, of course, held by its bearings so that it cannot move axially.

It will be seen that by varying the longitudinal position of the plunger 54 the lug 52 on the rack 45 will contact sooner or later with the plunger and the increment of cross feed will be varied. In order to so vary the position of the plunger we provide rack teeth 55 which teeth mesh with corresponding teeth on the hub of an index lever 57. Index lever 57 is pivotally mounted upon a graduated index plate 56, this plate being suitably carried on the side of the base 10. The index lever is provided with a handle which carries a plunger. The plunger is adapted to enter the numbered holes on the index plate and thereafter maintain the index lever in the position in which it has been set. The holes are suitably spaced for different settings of the plunger.

The above instrumentalities provide means for changing the thickness of the slices of meat cut by the machine. At the same time the setting can be made when the machine is in operation and when the meat plate table is reciprocating since all control handles are fixed on permanent parts of the machine. The graduated index plate provides a ready means of ascertaining the thickness of the slice of meat to be cut and is of decided advantage since customers learn to call for a particular thickness of slice by number such as 7, 10, 12, &c. With previous constructions the thickness of the slice has been controlled in an indefinite manner by the operator.

It will be understood that we do not limit our invention to the specific form and construction described and shown in the drawings. What we claim as our invention is more particularly pointed out in the appended claims.

We claim:—

1. In a device of the class described, the combination with a reciprocating element, a member adapted for transverse movement thereon, and a rotatable element carried by the reciprocating element and adapted to coöperate with the said member, of means for imparting a step by step rotary movement to the said rotatable element, said means comprising a ratchet on the said rotatable element, a pawl arm and pawl coöperating with the ratchet, a pinion secured to the pawl arm, a rack meshing with the pinion and adapted to reciprocate in unison with the reciprocating member, said rack being carried in guide members on the reciprocating member, means for arresting the movement of the rack, to thereby cause a relative movement between the rack and the reciprocating member, said means comprising a stop associated with a fixed part, a plunger to arrest the movement of the rack in the opposite direction, and an index connected by a rack and pinion with the plunger to position the same at different positions to thereby vary the increment of rotation imparted to the rotatable element.

2. In combination with the elements of the combination specified in claim 1, means mounted on and carried by the transversely movable member for operatively connecting the said rotatable element with, and disconnecting it from, said transversely movable member at will.

3. In a device of the class described, the combination with a reciprocating element, a member adapted for transverse movement thereon, a rotatable element carried by the reciprocating element and adapted to coöperate with said member, and means for imparting a step by step rotary movement to said rotatable element, of means for operatively connecting said rotatable element with, and disconnecting it from, said transversely movable member, said means comprising a threaded block carried by the said member, movable thereon to and from the rotatable element and normally spring pressed in a direction to engage said rotatable element, and a cam member provided with an operating handle to move said threaded block into and out of engagement with the rotatable element at will.

4. In a device of the class described, in combination, a reciprocating element, a member adapted for transverse movement thereon, a rotatable element carried by the reciprocating element and adapted to coöperate with the said member, means for rotating the rotatable element with a step by step movement, said means comprising a rack carried by guides on the reciprocating element and adapted to move in unison therewith, a lug depending from the rack, sound deadening cushion blocks on the said lug, a fixed stop in the path of said lug adapted to contact therewith and move the rack relatively to the reciprocating element, an adjustable stop in the path of said lug adapted to contact therewith and move the rack in the opposite direction, said adjustable stop comprising a plunger, having an adjustment on one end thereof, rack teeth on the plunger, a pinion meshing therewith and an index secured to the pinion and adapted to indicate the position of the plunger.

5. In a device of the class described, a reciprocating element, a rotatable element carried thereby, a bearing for one end of the rotatable element, said bearing comprising a sleeve like member carried by the reciprocating element, a ratchet on the end of the rotatable element adjacent the sleeve like member, a pinion journaled on the sleeve like member, a pawl arm associated therewith, a pawl adapted to engage the said ratchet carried by the pawl arm, and a rack supported in guides on the reciprocating element and meshing with the aforesaid pinion, and stops adapted to coöperate with said rack for reciprocating the same whereby the pinion is rotated and a step by step rotation is imparted to the rotatable element.

6. In a device of the class described, in combination, a reciprocating element, a member carried thereby and adapted to be moved transversely with respect to the reciprocating element, a rotatable element carried by the said reciprocating element for effecting such transverse movement, a support for one end of the rotatable element, said support comprising a casing having a sleeve bearing within the same to receive the rotatable element, a ratchet on said rotatable element within the casing, a rotatable pinion on the sleeve bearing, a pawl arm and pawl moving in unison with the pinion and coöperating with the ratchet, a rack meshing with the pinion and guided in the casing and upon the reciprocating element, said rack having provisions for reciprocating the same whereby the rotatable member may be given a step by step rotation.

7. In a device of the class described, in combination, a reciprocating element, a member carried thereby and adapted to be moved transversely with respect to the reciprocating element, a rotatable element carried by the said reciprocating element to effect such transverse movement, a support for one end of the rotatable element, said support comprising a casing having a sleeve bearing within the same to receive the rotatable element, a ratchet on said rotatable element within the casing, a rotatable pinion on the sleeve bearing, a pawl arm and pawl moving in unison with the pinion and coöperating with the ratchet, a rack meshing with the pinion and guided in the casing and upon the reciprocating element, a plunger and a fixed stop to coöperate with the rack and move the same relatively to the reciprocating element, whereby the rotatable member may be given a step by step rotation and an index device adapted to be variably positioned to variably position the aforesaid plunger whereby the extent of movement of the rack may be varied.

In testimony whereof we affix our signatures in the presence of two subscribing witnesses.

JOSEPH HOPKINSON.
CLINTON HOLT MALTBY.

Witnesses:
YALE D. BLACK,
D. HELEN HOLBERT.